(12) United States Patent
Wegener

(10) Patent No.: US 7,766,411 B2
(45) Date of Patent: Aug. 3, 2010

(54) ADJUSTING MECHANISM OF A SOFT TOP COMPARTMENT COVER OF A CONVERTIBLE

(75) Inventor: Fritz Wegener, Gilching (DE)

(73) Assignee: Webasto AG, Stockdorf (DE)

( * ) Notice: Subject to any disclaimer, the term of this patent is extended or adjusted under 35 U.S.C. 154(b) by 239 days.

(21) Appl. No.: 11/995,578

(22) PCT Filed: Jul. 13, 2006

(86) PCT No.: PCT/DE2006/001213

§ 371 (c)(1),
(2), (4) Date: Jun. 30, 2008

(87) PCT Pub. No.: WO2007/006294

PCT Pub. Date: Jan. 18, 2007

(65) Prior Publication Data

US 2009/0051190 A1 Feb. 26, 2009

(30) Foreign Application Priority Data

Jul. 14, 2005 (DE) .................. 10 2005 033 599

(51) Int. Cl.
*B60J 7/20* (2006.01)
(52) U.S. Cl. ................................. 296/107.08
(58) Field of Classification Search ............... 180/69.2; 296/76, 107.01, 107.08, 116, 117
See application file for complete search history.

(56) References Cited

U.S. PATENT DOCUMENTS

| | | | | |
|---|---|---|---|---|
| 2,845,299 A | * | 7/1958 | Pickering | 296/136.06 |
| 4,679,841 A | * | 7/1987 | Taunay | 296/76 |
| 5,533,777 A | * | 7/1996 | Kleemann et al. | 296/117 |
| 5,967,593 A | * | 10/1999 | Schuler et al. | 296/136.06 |
| 6,193,300 B1 | * | 2/2001 | Nakatomi et al. | 296/107.08 |
| 6,352,298 B1 | * | 3/2002 | Hayashi et al. | 296/107.08 |
| 6,786,525 B2 | * | 9/2004 | Russke et al. | 296/76 |
| 6,824,194 B2 | * | 11/2004 | Weissmueller et al. | 296/136.05 |
| 7,455,346 B2 | * | 11/2008 | Kostadinov | 296/107.08 |
| 2002/0011739 A1 | * | 1/2002 | Nicastri | 296/107.08 |
| 2002/0041109 A1 | * | 4/2002 | Wagner et al. | 296/107.08 |
| 2002/0093218 A1 | * | 7/2002 | Weissmueller et al. | 296/136 |
| 2002/0125731 A1 | * | 9/2002 | Hasselgruber et al. | 296/107.01 |
| 2002/0130532 A1 | * | 9/2002 | Halbweiss et al. | 296/136 |

(Continued)

FOREIGN PATENT DOCUMENTS

DE 4445944 4/1996

(Continued)

*Primary Examiner*—Glenn Dayoan
*Assistant Examiner*—Paul A Chenevert
(74) *Attorney, Agent, or Firm*—Fitch, Even, Tabin & Flannery; John M. Naber

(57) ABSTRACT

An adjusting mechanism of a movable component, particularly a soft top compartment cover of a convertible, which is movably mounted by means of at least one control arm (2) that is hingedly connected to the vehicle body. A crossarm gear (19, 20) is mounted between the control arm (2) and a drive unit (27, 28) of the adjusting mechanism. In order to improve the moving behavior of the movable component, the control arm (2) is coupled to a rotatably mounted crank (14) via a coupling rod (11). Said crank (14) is connected to a driving arm (21) via two crossarms (19, 20), the driving arm (21) being movable by the drive unit (27, 28).

11 Claims, 8 Drawing Sheets

U.S. PATENT DOCUMENTS

2006/0138800 A1* 6/2006 Bruder et al. .......... 296/107.08
2007/0132271 A1* 6/2007 Brockhoff et al. ...... 296/107.08
2007/0176457 A1* 8/2007 Brockhoff et al. ............. 296/76

FOREIGN PATENT DOCUMENTS

DE 10108493 9/2001
DE 10116094 10/2002
EP 1247676 10/2002

* cited by examiner

ADJUSTING MECHANISM OF A SOFT TOP COMPARTMENT COVER OF A CONVERTIBLE

This application is a 35 U.S.C. §371 National Stage entry of PCT/DE2006/001213, filed Jul. 13, 2006, which claims priority from German Patent Application No.: DE 10 2005 033 599.3, filed Jul. 14, 2005, the contents of which are herein incorporated by reference.

The invention relates to an adjusting mechanism of a movable component, in particular of a convertible top compartment cover of a convertible, which component is mounted movably by means of at least one link coupled on the vehicle body, with a cross link mechanism being connected between the link and a drive unit of the adjusting mechanism.

DE 44 45 944 C1 has disclosed an adjusting mechanism for a tailgate which also forms a convertible top compartment cover. A hydraulic cylinder supported on the vehicle body pivots an auxiliary frame, which bears the convertible top compartment cover, about a mounting on the rear side. During the initial opening movement from the closed position, the movement of the hydraulic cylinder brings about a correspondingly high movement speed of the convertible top compartment cover. Said high speed is undesirable, in particular over the last closing distance in which the convertible top compartment cover is likewise moved at a high speed into the end position.

DE 101 16 094 C2 discloses a movable vehicle roof, the bearing device of which comprises a main link which is mounted pivotably on a rotary joint on the vehicle body. A roof link which is likewise pivotable about the rotary joint is coupled in a rotationally fixed manner to the main link and is connected to a driving device via two cross links coupled in a cross link arrangement. An improved sequence of movement during the opening and closing of the vehicle roof is to be obtained by means of the cross link arrangement. However, the direct coupling of the roof link to the main link limits an optimization of the sequence of movement.

The invention is based on the object of providing an adjusting mechanism which has an improved sequence of movement.

According to the invention, this object is achieved with the adjusting mechanism wherein a link is coupled via a coupling rod to a rotatably mounted crank which is connected via two cross links to a driving link which can be moved by the drive unit. The coupling rod permits adaptation of the transmission ratio of the movement between the crank and the link supporting the component. By means of a corresponding arrangement and design of the coupling rod, an initially high adjustment movement speed of the crank or of the drive unit can be converted into a low speed at the main link. The movable component may be a convertible top compartment cover of a convertible, a frame supporting the convertible top compartment cover, a convertible hard top or convertible top roof of a convertible or else a different part of a vehicle or convertible which can be moved, for example by means of a pivotably mounted link, and can be adjusted into two end positions.

The crank can expediently be pivoted through an angle of rotation of approximately 180°. Said angle of rotation can be achieved in a kinematically favorable manner by means of the cross link arrangement. However, the angle of rotation may also be selected to be larger or smaller. Furthermore, it is advantageous if the crank is mounted rotatably between the two articulation points of the cross links and has a laterally protruding arm to which the coupling rod is coupled. Selection of the length of the arm and/or of the distance of the articulation point from the axis of rotation of the crank makes it possible for the movement performance of the kinematics to likewise be adjusted and coordinated.

It is particularly preferred if, in the one end position, for example a closed position of a flap, a convertible top compartment cover or a roof component, and/or in the other end position of the component, for example the open position of said component, the coupling rod and the crank are arranged in a dead center position in which the crank maintains its position if a force is introduced to the coupling rod by the component. In this case, in the closed position, the coupling rod may also be arranged in a position beyond the dead center, in particular approximately 2° to 3° beyond the dead center position, in relation to the crank in order to obtain secure locking of the kinematics.

The drive unit, which, in particular, acts linearly, is securely supported if the driving link is coupled to an oscillating lever which is coupled pivotably to a positionally fixed bearing part or a bearing part which is fixed on the vehicle body. The drive unit can then be supported on the connecting joint of the driving link by means of the oscillating lever, or else on the driving link or on the oscillating lever.

A hydraulic cylinder unit is preferably provided as the drive unit which, firstly, acts on the connecting joint between the oscillating lever and the driving link and, secondly, is at least temporarily supported in a positionally fixed manner. However, other drive units, such as, for example, pneumatic or electromechanical drive units, may also be provided.

The adjusting mechanism is therefore preferably designed kinematically in such a manner that, at an essentially constant driving speed of the drive unit, the link is pivoted at a low adjusting speed in the vicinity of the two end positions of the component and of the adjusting mechanism, and, in between, is pivoted at a higher speed. Furthermore, the driving speed of the drive unit may also be variable and regulated, as a result of which the adjusting speed can additionally be influenced.

If the drive unit or the hydraulic cylinder unit is connected at the other end to a locking device for fixing the component in an end position, in particular in an open position, during its initial movement it can first of all execute an unlocking movement and, after the unlocking movement is executed, can be supported in a positionally fixed manner on the locking side. The support can be obtained by the link having a device, such as, for example, a locking curve or a blocking guide slot, which blocks a movement of the locking device as a function of the pivoted position of the link. The locking curve is formed, for example, as a laterally protruding web or as a sector of a ring which, in particular, is arranged concentrically with respect to the pivot axis of the link. However, a different part of the kinematics may also have or activate a locking device.

The adjusting mechanism is explained in more detail below using an exemplary embodiment and with reference to the drawing, in which.

Figure 1:
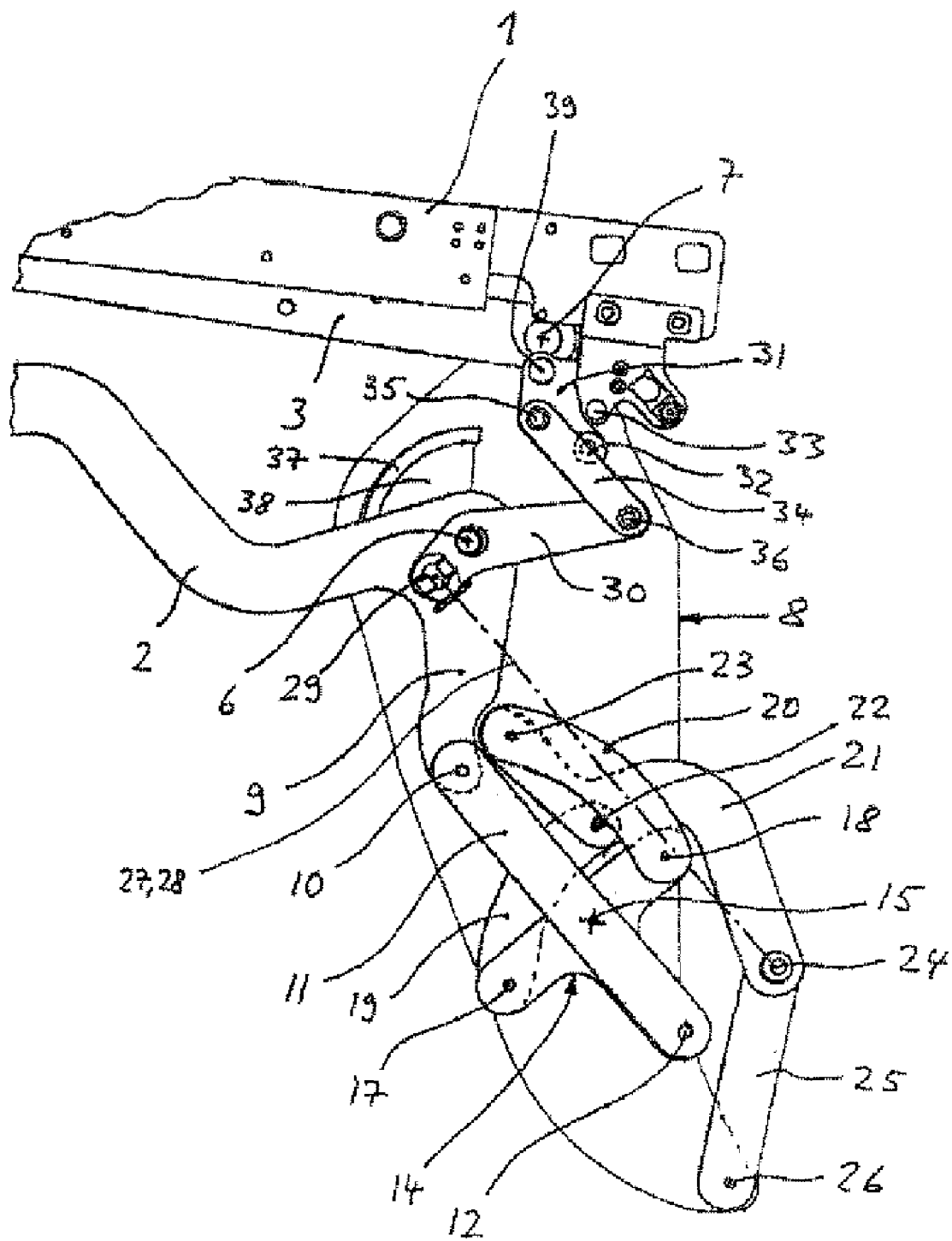
FIG. 1 shows, in a lateral plan view, an adjusting mechanism of a convertible top compartment cover of a convertible, which cover is arranged in its closed position.

A convertible top compartment cover of a convertible (not illustrated) is mounted on a frame 1 which is pivoted to the rear before the collapsible or folding roof is put away in a rear convertible top storage space, and therefore the convertible top compartment cover which is fixed on said frame is raised at its front edge and opens up a passage opening for the collapsible or folding roof to be put away, which roof may be, in particular, a hard top roof or else a convertible top. The convertible top compartment cover may also serve as a trunk cover by, when the frame 1 is fixed to the vehicle body, being pivoted up out of its closed position with its rear edge relative to the frame 1 or the vehicle body and therefore opening up a loading opening of the trunk. DE 44 45 944 C1 basically discloses a convertible top compartment cover of this type which is supported via an auxiliary frame mounted on the vehicle rear in a manner such that it can pivot about a pivot axis fixed on the vehicle body.

The frame 1 of the convertible top compartment cover is mounted pivotably on both sides of the vehicle body by means of a respective main link 2 and an auxiliary link 3 which form a four-joint mechanism together with the joints 4 and 5 on the frame 1 and the joints 6 and 7 on a bearing plate 8 fixed on the vehicle body. The frame 1 is, for example, of U-shaped design corresponding to the auxiliary frame disclosed in DE 44 45 944 C1.

A bent extension 9 of the main link 2, which extension extends beyond the joint 6 which forms a bearing axis, is connected on the end side in a joint 10 to a coupling rod 11 which, in turn, is coupled pivotably in a joint 12 to a laterally protruding arm 13 of an approximately T-shaped crank 14. The crank 14 is mounted pivotably on the bearing plate 8 in an axis of rotation 15 and, at its base 16, contains two joints 17 and 18 which lie opposite each other with respect to the axis of rotation 15 and to each of which a cross link 19 and 20, respectively, of a cross link mechanism is coupled. The two cross links 19 and 20 are coupled in a cross link arrangement at the other end to a driving link 21 in joints 22 and 23 which are spaced apart from each other, with the joint 23 being arranged at one end of the driving link 21 which is coupled at its other end in a joint 24 to an oscillating lever 25 which, in turn, is coupled pivotably to the lower end of the bearing plate 8 in a joint 26.

Figure 5:
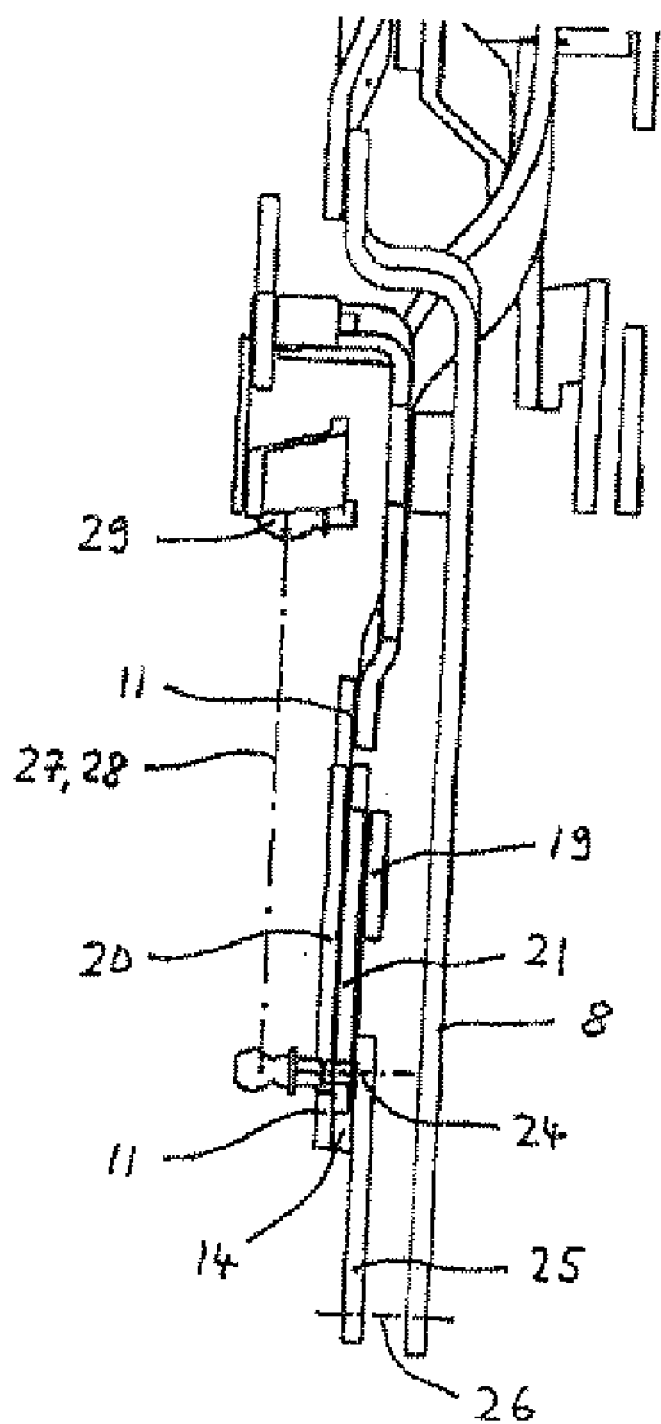
FIG. 5 shows, in a side view, the adjusting mechanism in the intermediate position shown in FIG. 4.

All of the links are formed as flat, plate-like components, and therefore the adjusting mechanism is a very slim construction in the transverse direction of the vehicle (see FIG. 5).

A hydraulic cylinder unit (only illustrated in FIG. 3 and otherwise illustrated schematically by means of a chain-dotted line) is provided as the driving device for pivoting the four-joint mechanism, the piston rod 27 of which unit is coupled at the joint 24 to the driving link 21 and the cylinder 28 of which unit is coupled in a joint 29 to a transmission lever 30 which is mounted in the joint 6 in a manner such that it can be pivoted coaxially with respect to the main link 2. The transmission lever 30 is part of a locking kinematics with which the frame 1 can be fixed and can be locked in its closed position on the vehicle body or on the bearing plate 8. The locking kinematics contains a lock hook 31 which is coupled pivotably to the bearing plate 8 in a pivot axis 32 and is provided for locking engagement with a locking part, such as, for example, a locking bolt 33 which is fastened to the rear edge region of the frame 1. A coupling 34 connects the lock hook 31 to the transmission lever 30 in the joints 35 and 36, the joint 36 being arranged on a section of the transmission lever 30 that extends beyond the joint 6, and the distance between the joint 36 and the joint 6 which forms the pivot axis being a multiple of the distance between the joint 29 and the joint 6.

In the closed position of the convertible top compartment cover and of the frame 1 (see FIG. 1), the piston rod 27 of the hydraulic cylinder unit is retracted, and the crank 14 is pivoted via the driving link 21 and the cross link mechanism into an end position in which the longitudinal axis of the coupling rod 11 essentially runs through the axis of rotation 15 of the crank 14. The coupling rod 11 is therefore located on the crank 14 in a dead center position in which a force introduced to the coupling rod 11 by the main link 2 does not produce any movement of the crank 14. The hydraulic cylinder unit is accordingly relieved from force in the closed position.

The three joints 22, 23 and 24 of the driving link 21 lie, for example, approximately on a straight line, with, however, the driving link 21 being curved or bulged between the joints 22 and 24, and therefore, in the end or closed position illustrated in FIG. 1, the driving link 21 engages in a space-saving manner around that end of the crank 14 which contains the joint 18, since the crank 14 and the driving link 21 are essentially arranged in a pivoting plane in a space-saving manner.

The locking kinematics is arranged in a locking position and keeps the locking bolt 33 of the frame 1 locked by means of the lock hook 31.

In order to pivot up the convertible top compartment cover at the front edge, the hydraulic cylinder unit is actuated and its increase in length on account of the extending piston rod 27 first of all causes the transmission lever 30 to be pivoted in the clockwise direction (according to FIG. 1) and the lock hook 31 to be opened via the coupling 34, with the locking bolt 33 being released. The initial expansion of the hydraulic cylinder unit first of all actuates the locking kinematics, since a comparatively low force is required for this, whereas, due to the weight of the convertible top compartment cover and of the frame 1, a shifting of the crank 14 or of the driving link 21 coupled to it via the cross links 19 and 20 requires a greater effort.

The different distances of the joints 29 and 36 from the pivot axis 6 of the transmission lever 30 bring about an increase in the transmission ratio of the adjustment or unlocking distance, and therefore a small increase in length of the hydraulic cylinder unit is sufficient in order to unlock the locking kinematics or the lock hook 31.

When the lock hook 31 is unlocked, it or another component of the locking kinematics bears against a stop such that further extension of the piston rod 27 via the joint 24 adjusts the driving link 21 in the opening direction (movement from FIG. 1 to FIG. 2) and the latter pivots the crank 14 via the two cross links 19 and 20. Via the coupling rod 11 connected in between, the main link 2 is pivoted about its bearing axis 6, with the rotating crank 14 first of ail only bringing about a small movement of the coupling rod 11 at the joint 10 and therefore an initially slow pivoting of the main link 2. However, this reduction of the speed of movement results in the transmission of a high adjustment or opening force to the main link 2 as a desirable secondary effect.

Figure 2:
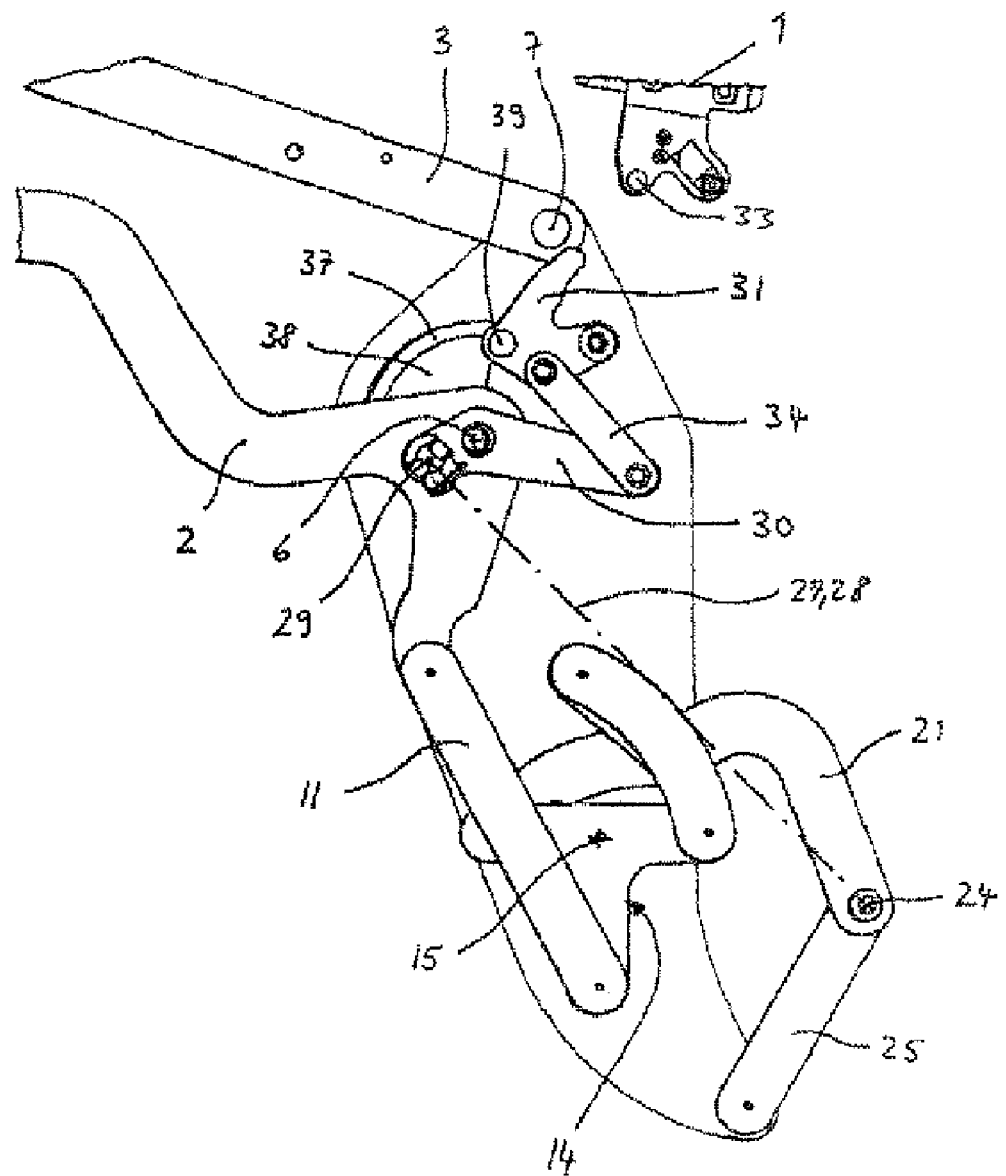
FIG. 2 shows, in a lateral plan view, the adjusting mechanism in a first intermediate position during the opening of the convertible top compartment cover.

An annular segment 37 which is concentric with respect to the bearing axis 6 is fastened to the main link 2 in the region of its bearing axis 6 by means of a support plate 38, which is attached fixedly to the main link 2, in such a manner that, in the position of FIG. 2, the annular segment 37 begins to engage behind a supporting bolt 39 protruding from the lock hook 31 laterally in relation to the bearing plate 8. The lock hook 31 is blocked against pivoting in the closing direction by the annular segment 37 and, as a result of this, the locking end of the hydraulic cylinder unit is held in a positionally fixed manner even if an undesirable load or force acts on the opening convertible top compartment cover or frame 1.

Figure 3:
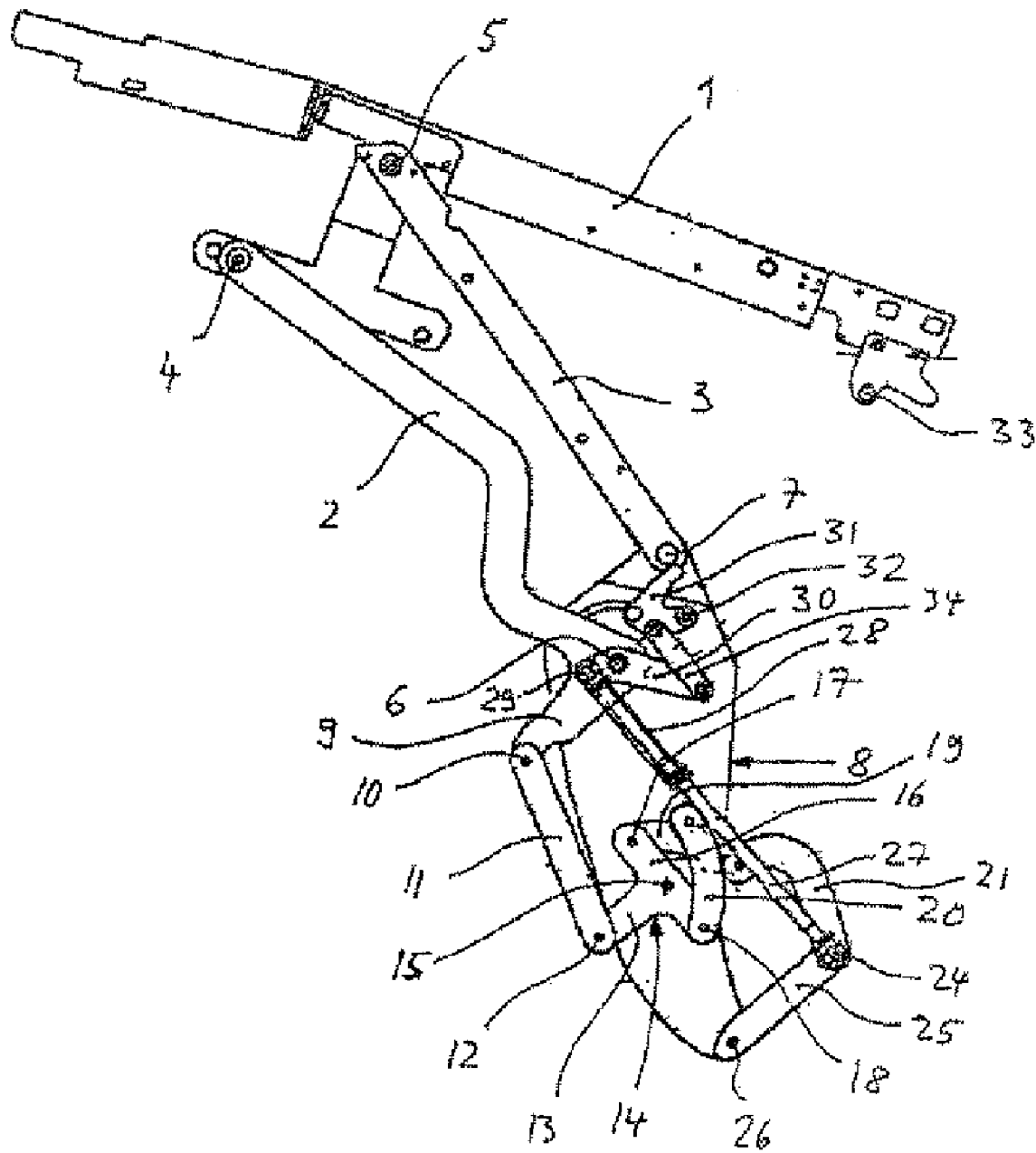
FIG. 3 shows, in a lateral plan view, the adjusting mechanism together with a frame of a convertible top compartment cover in a second intermediate position during the opening of the convertible top compartment cover.
Figure 4:
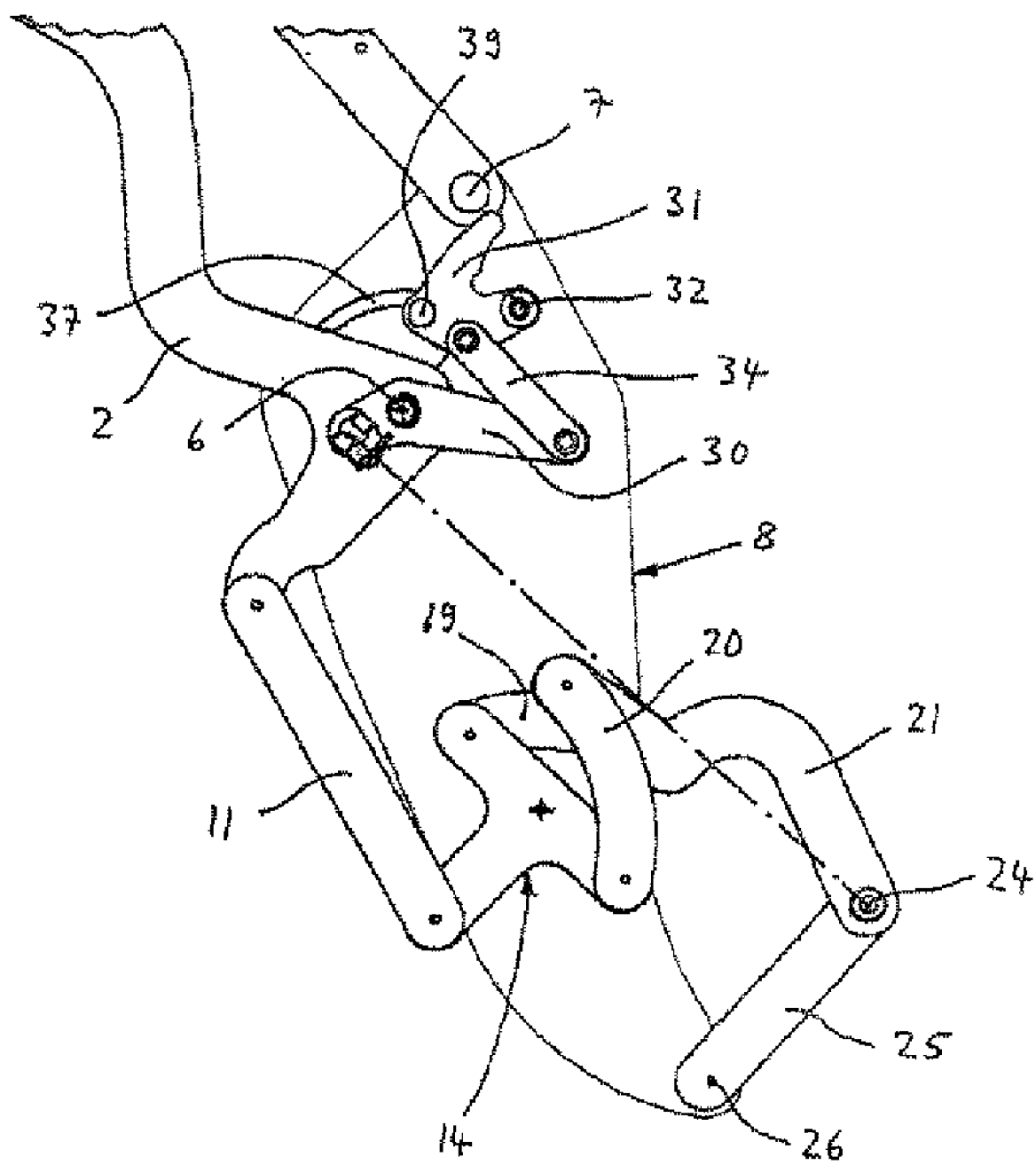
FIG. 4 shows, in a lateral plan view, the adjusting mechanism in the intermediate position shown in FIG. 3.

Further extension of the piston rod 27 moves the adjusting mechanism into the position which is illustrated in FIGS. 3 and 4 and in which, owing to the approximately right-angled position of the arm 13 of the crank 14 and the coupling red 11 with respect to each other, the movement of the piston rod 27 produces a maximum adjustment movement of the coupling rod 11 and therefore a maximum adjusting speed of the main link 2.

Figure 6:
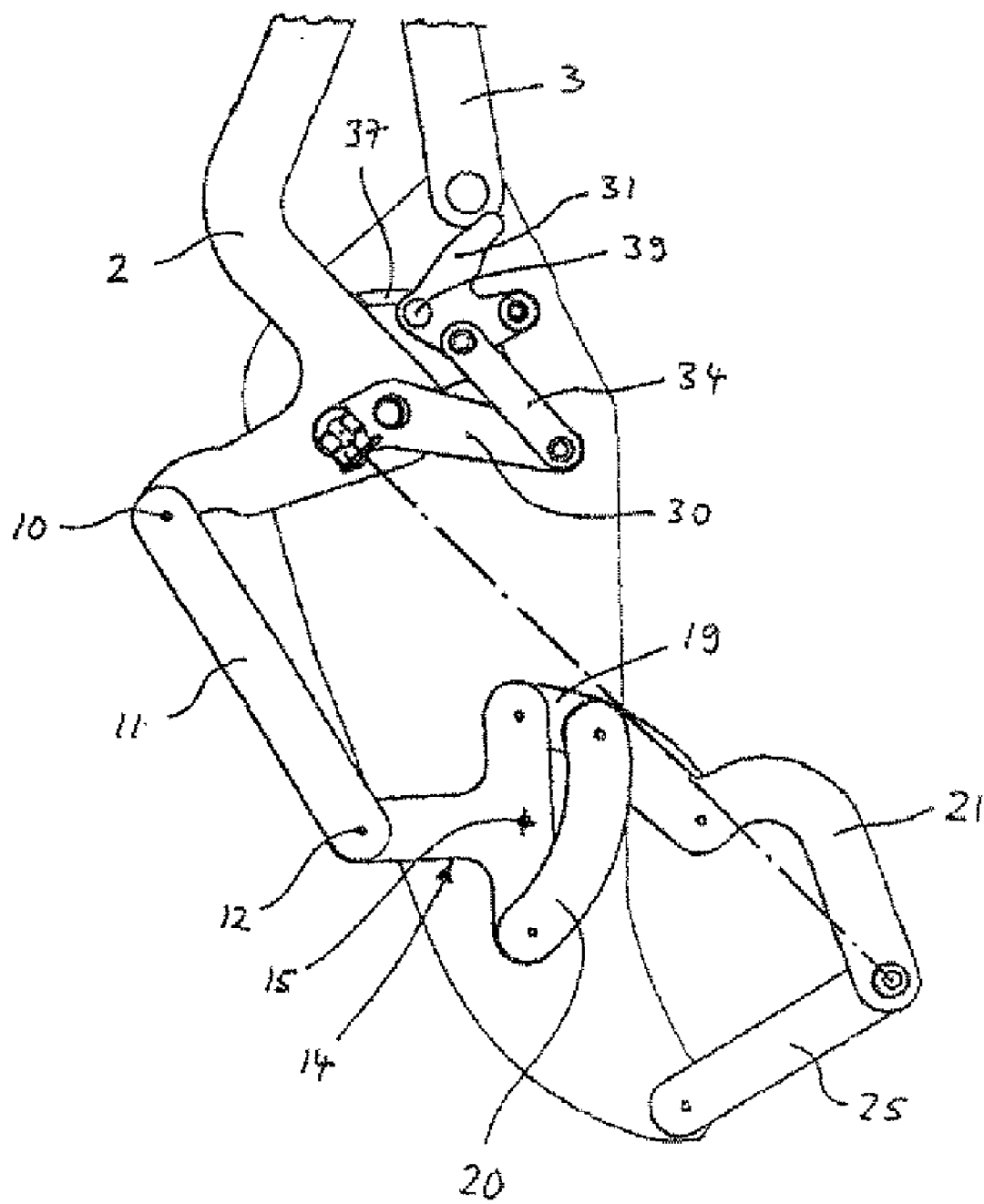
FIG. 6 shows, in a lateral plan view, the adjusting mechanism in a further intermediate position.

During the further opening course, the crank 14 passes through a pivoting angle region (an exemplary position is illustrated in FIG. 6) in which the joint 12, which is arranged on the arm 14, of the connecting straight line between the axis of rotation 15 of the crank 14 and the joint 10 approaches the extension 9 of the main link 2. The speed of the adjustment movement of the coupling rod 11 therefore decreases significantly again until, finally, it becomes zero in the position illustration in FIG. 7. In the movement end position, the coupling rod 11 and the crank 14 are again in a dead center position in which an introduction of force to the coupling rod 11 from the main link 2 does not bring about any adjustment of the crank 14. The crank 14 has therefore been pivoted about a pivot angle of approximately 180°.

Figure 7:
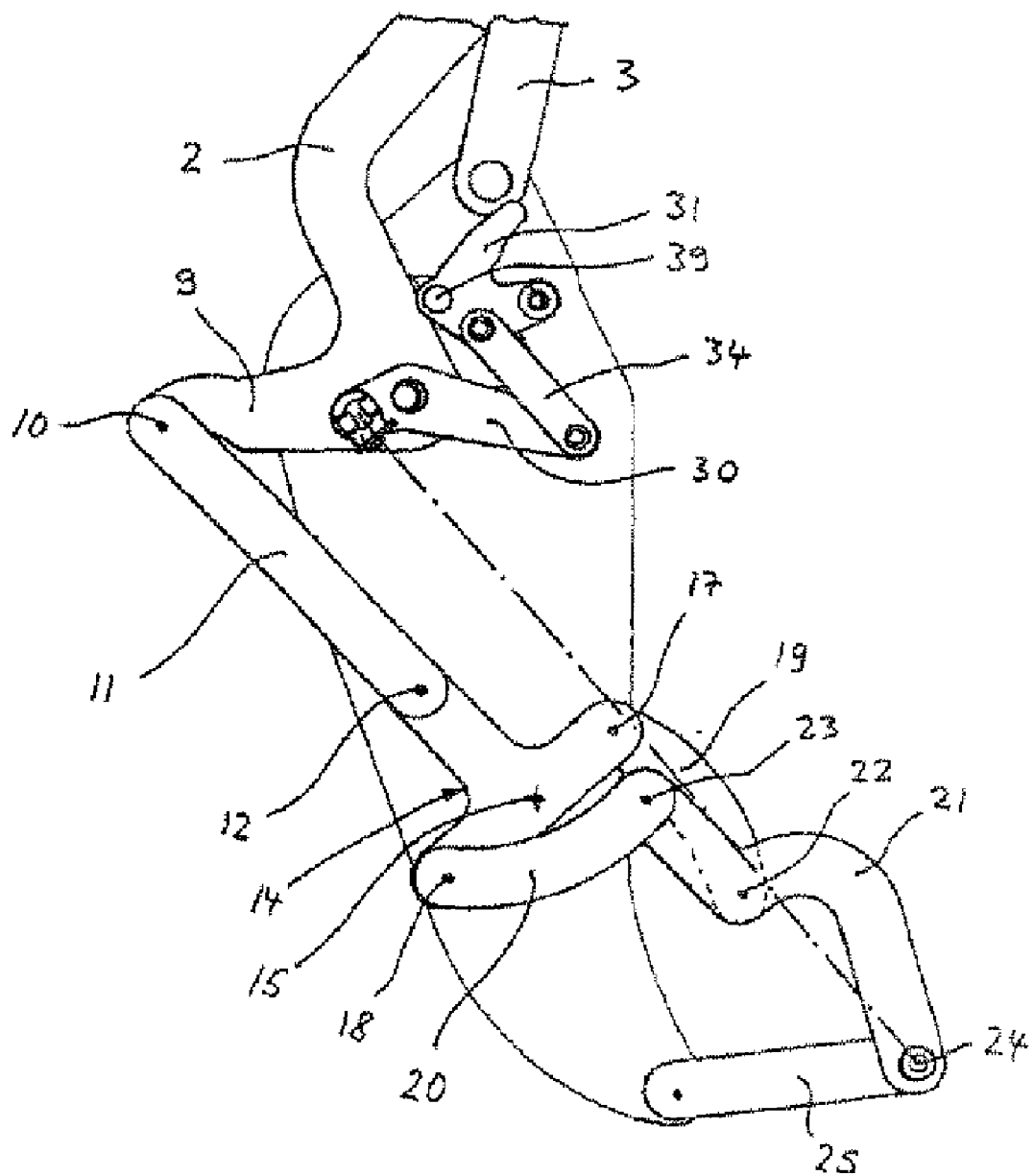
FIG. 7 shows, in a lateral plan view, the adjusting mechanism in an end position with the convertible top compartment cover open.
Figure 8:
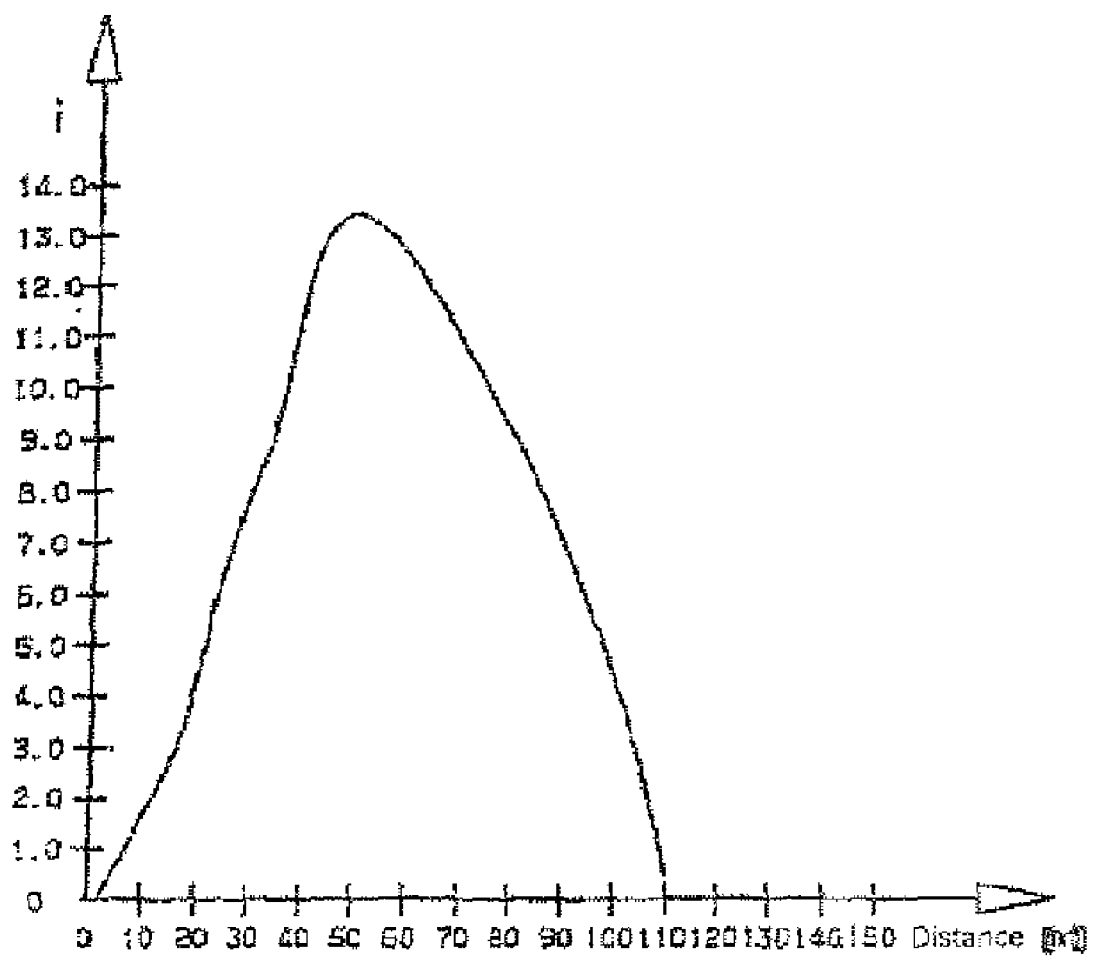
FIG. 8 shows a diagram with a profile of the transmission ratio between a movement of a driving device and a movement assigned to the component to be adjusted.

A transmission ratio profile which is illustrated in FIG. 8 can be obtained with said adjusting mechanism. The abscissa of the diagram shows the movement distance or change in length or increase in length of the hydraulic cylinder unit between the first end position of the closed position or the convertible top compartment cover and the second end position or the open position of the convertible top compartment cover, with a distance of zero corresponding to the position of FIG. 1 and the maximum distance (110 mm) corresponding to the position of FIG. 7. The ordinate indicates the respective transmission ratio between input and output movement and therefore also represents the speed profile. By means of the adjusting mechanism according to the invention, the force profile is optimized and the movement distance of the hydraulic cylinder unit shortened, as a result of which the adjustment time is also shortened. The convertible top compartment cover is therefore moved gently into its two end positions, with a high adjustment or supporting force being provided.

In the end position according to FIG. 7, the crank 14 can also be pivoted by approximately 1 to 3° beyond the dead center position in order to achieve secure locking of the adjusting mechanism when the convertible top compartment cover is open.

The closing of the convertible top compartment cover and of the frame 1 takes place in an opposite sequence of movement by contraction of the hydraulic cylinder unit 27, 28.

In an alternative configuration of the adjusting mechanism, rather than being attached in the joint 29, the hydraulic cylinder unit 27, 28 may also be attached, for example, to the joint 6 or to another part fixed on the vehicle. The actuation of the locking device or of the lock hook 31 then takes place via its own drive or by means of a coupling of the movement to another part of the kinematics.

The invention claimed is:

1. An adjusting mechanism of a movable component, of a convertible top compartment cover of a convertible, which component is mounted movably by at least one link coupled on the vehicle body, with a cross link mechanism being connected between the link and a drive unit of the adjusting mechanism, characterized in that the link is coupled via a coupling rod to a rotatably mounted crank which is connected via two cross links to a driving link which can be moved by the drive unit.

2. The adjusting mechanism of claim 1, characterized in that the crank can be pivoted through an angle of rotation of approximately 180°.

3. The adjusting mechanism of claim 1 characterized in that the crank is mounted rotatably between the two articulation points of the cross links and has a laterally protruding arm to which the coupling rod is coupled.

4. The adjusting mechanism of claim 1, characterized in that at least one end position of the component, the coupling rod and the crank are arranged in a dead center position in which the crank maintains a substantially constant position if a force is introduced to the coupling rod by the component.

5. The adjusting mechanism of claim 1, characterized in that the driving link is coupled to an oscillating lever which is coupled pivotably to a positionally fixed bearing part.

6. The adjusting mechanism of claim 1, characterized in that a hydraulic cylinder unit is provided as the drive unit which, firstly, acts on a connecting joint the connecting joint between the oscillating lever and the driving link and, secondly, is at least temporarily supported in a positionally fixed manner.

7. The adjusting mechanism of claim 1, characterized in that the adjustment mechanism is designed kinematically in such a manner that, at an essentially constant driving speed of the drive unit, the link is pivoted at a low adjusting speed in the vicinity of the two end positions of the component and of the adjusting mechanism, and, in between, is pivoted at a higher speed.

8. The adjusting mechanism of claim 1, characterized in that the drive unit is connected at one end to a locking device for fixing the component in an end position, in particular in an closed position, and during the initial movement first of all executes an unlocking movement and, subsequently, is supported in a positionally fixed manner.

9. The adjusting mechanism of claim 8, characterized in that the link has a locking curve which blocks a movement of the locking device as a function of the pivoted position of the link.

10. The adjusting mechanism of claim 1, characterized in that, in the closed position, the coupling rod is arranged in a position beyond the dead center, in particular approximately 2° to 3° beyond the dead center position, in relation to the crank.

11. The adjusting mechanism of claim 1, characterized in that a blocking device is provided which, when is moved in the direction of the second end position, prevents the drive unit from moving back.

* * * * *